US012686483B1

(12) United States Patent
Witte

(10) Patent No.: US 12,686,483 B1
(45) Date of Patent: Jul. 21, 2026

(54) COOLING SYSTEM FOR A MARINE VESSEL

(71) Applicant: Brunswick Corporation, Mettawa, IL (US)

(72) Inventor: John Witte, Ada, MI (US)

(73) Assignee: Brunswick Corporation, Mettawa, IL (US)

( * ) Notice: Subject to any disclaimer, the term of this patent is extended or adjusted under 35 U.S.C. 154(b) by 706 days.

(21) Appl. No.: 18/053,513

(22) Filed: Nov. 8, 2022

(51) Int. Cl.
B63J 2/12 (2006.01)
B08B 9/032 (2006.01)
(Continued)

(52) U.S. Cl.
CPC .............. B63J 2/12 (2013.01); B08B 9/0325 (2013.01); B63B 57/00 (2013.01); F28G 9/00 (2013.01);
(Continued)

(58) Field of Classification Search
CPC .... B63J 2/12; B08B 9/0325; B08B 2209/032; B63B 57/00; F28G 9/00; H01M 10/613;
(Continued)

(56) References Cited

U.S. PATENT DOCUMENTS

| | | | | | |
|---|---|---|---|---|---|
| 3,872,920 A | * | 3/1975 | Honma | ...................... | F28G 1/12 |
| | | | | | 165/95 |
| 3,978,917 A | * | 9/1976 | Honma | ...................... | F28G 1/12 |
| | | | | | 165/95 |

(Continued)

FOREIGN PATENT DOCUMENTS

| | | | | | |
|---|---|---|---|---|---|
| CN | 104785466 A | * | 7/2015 | ............... | B08B 7/00 |
| CN | 109115021 A | * | 1/2019 | ............. | F28G 15/00 |

(Continued)

OTHER PUBLICATIONS

Boks et al., "System And Peripheral Devices For A Marine Vessel," U.S. Appl. No. 17/227,959, filed Apr. 12, 2021 (specification and drawings only).

(Continued)

*Primary Examiner* — Jenna M Maroney
*Assistant Examiner* — Gustavo A Hincapie Serna
(74) *Attorney, Agent, or Firm* — Andrus Intellectual Property Law, LLP

(57) ABSTRACT

A cooling system for a marine vessel includes a cooling loop with an inlet; a pump configured pump raw cooling water through the cooling loop; and an outlet. A first switching valve is downstream from the inlet and upstream from the pump and a second switching valve is downstream from a heat exchanger and upstream from the outlet. A reservoir has an outlet in fluid communication with the first switching valve and an inlet in fluid communication with the second switching valve. The first switching valve and the second switching valve are switchable between a first position in which the reservoir inlet and outlet are disconnected from the cooling loop and a second position in which the reservoir inlet and outlet are in fluid communication with the cooling loop via the first switching valve. The pump is configured to circulate cleaning solution from the reservoir through the cooling loop.

19 Claims, 3 Drawing Sheets

(51) Int. Cl.
| | |
|---|---|
| *B63B 57/00* | (2006.01) |
| *F28G 9/00* | (2006.01) |
| *H01M 10/613* | (2014.01) |
| *H01M 10/625* | (2014.01) |
| *H01M 10/63* | (2014.01) |
| *H01M 10/6568* | (2014.01) |

(52) U.S. Cl.
CPC ....... *H01M 10/613* (2015.04); *H01M 10/625* (2015.04); *H01M 10/63* (2015.04); *H01M 10/6568* (2015.04); *B08B 2209/032* (2013.01); *H01M 2220/20* (2013.01)

(58) Field of Classification Search
CPC ............... H01M 10/625; H01M 10/63; H01M 10/6568; H01M 2220/20
USPC ........................................................ 165/11.1
See application file for complete search history.

(56) References Cited

U.S. PATENT DOCUMENTS

| | | | | |
|---|---|---|---|---|
| 4,556,102 | A * | 12/1985 | Bochinski | F28G 1/12 |
| | | | | 165/95 |
| 4,762,168 | A * | 8/1988 | Kawabe | F28F 19/02 |
| | | | | 165/95 |
| 4,865,121 | A * | 9/1989 | Ben-Dosa | F28G 1/12 |
| | | | | 165/95 |
| 5,392,797 | A * | 2/1995 | Welch | B08B 9/0323 |
| | | | | 134/108 |
| 5,447,193 | A * | 9/1995 | Peery | F28G 1/12 |
| | | | | 165/95 |
| 6,379,201 | B1 * | 4/2002 | Biggs | F02B 61/04 |
| | | | | 440/88 N |
| 6,912,895 | B1 | 7/2005 | Jaeger | |
| 7,025,643 | B1 | 4/2006 | Csitari | |
| 7,309,266 | B2 | 12/2007 | Botsaris et al. | |
| 7,318,396 | B1 | 1/2008 | Belter et al. | |
| 7,398,745 | B1 | 7/2008 | White et al. | |
| 7,585,196 | B1 * | 9/2009 | Jaeger | F01P 11/20 |
| | | | | 440/88 HE |
| 8,298,025 | B2 * | 10/2012 | Eichinger | F01P 3/202 |
| | | | | 440/88 C |
| 8,479,691 | B1 * | 7/2013 | Taylor | F01P 3/202 |
| | | | | 123/41.82 R |
| 8,535,104 | B1 * | 9/2013 | Nida | B63H 21/383 |
| | | | | 62/3.61 |
| 8,628,628 | B1 * | 1/2014 | Bonner | F28G 9/00 |
| | | | | 134/166 R |
| 8,839,831 | B2 | 9/2014 | Gregal | |
| 9,266,747 | B1 | 2/2016 | Sparrow et al. | |
| 9,321,662 | B2 | 4/2016 | Holland | |
| 9,359,233 | B2 | 6/2016 | Holland | |
| 9,403,588 | B1 * | 8/2016 | George | B63H 20/285 |
| 9,433,981 | B1 * | 9/2016 | Lofton | B08B 3/10 |
| 10,345,058 | B1 * | 7/2019 | St. John | B08B 9/027 |
| 10,436,488 | B2 | 10/2019 | Zugibe et al. | |
| 11,293,335 | B1 | 4/2022 | Radavich et al. | |
| 11,414,166 | B2 * | 8/2022 | Thompson | H01M 10/6568 |
| 11,578,640 | B1 * | 2/2023 | Schuricht | F01P 3/207 |
| 11,691,707 | B1 * | 7/2023 | Oenick | F01P 3/207 |
| | | | | 440/88 R |
| 2005/0139238 | A1 * | 6/2005 | Ferrara | C10B 43/08 |
| | | | | 134/10 |
| 2006/0179861 | A1 * | 8/2006 | Weber | H01Q 1/34 |
| | | | | 62/240 |
| 2008/0210262 | A1 * | 9/2008 | Lauzon | B08B 9/08 |
| | | | | 134/22.12 |
| 2015/0053626 | A1 | 2/2015 | Caulkins et al. | |
| 2015/0182905 | A1 * | 7/2015 | Langh | B01D 53/1456 |
| | | | | 96/240 |
| 2015/0298990 | A1 * | 10/2015 | Urke | C02F 1/02 |
| | | | | 210/747.6 |
| 2018/0283818 | A1 * | 10/2018 | Victor | B01J 19/0013 |
| 2019/0017431 | A1 * | 1/2019 | Hilakari | F28G 9/00 |
| 2020/0061527 | A1 * | 2/2020 | Gong | B01D 53/56 |
| 2020/0198752 | A1 * | 6/2020 | Christensen | C02F 1/02 |
| 2020/0377828 | A1 * | 12/2020 | Literski | C11D 3/2082 |
| 2021/0222871 | A1 * | 7/2021 | Choi | B08B 9/0323 |
| 2021/0222968 | A1 * | 7/2021 | Choi | F28G 15/04 |
| 2021/0371064 | A1 * | 12/2021 | Boks | B63B 21/04 |
| 2022/0212770 | A1 * | 7/2022 | Cosentino | B63B 79/30 |

FOREIGN PATENT DOCUMENTS

| | | | | |
|---|---|---|---|---|
| CN | 109642488 | A * | 4/2019 | F01P 11/16 |
| CN | 111392019 | A * | 7/2020 | B23H 21/38 |
| CN | 112282914 | A * | 1/2021 | F02M 31/16 |
| CN | 113104191 | A * | 7/2021 | B63H 21/383 |
| CN | 114636317 | A * | 6/2022 | B23H 21/10 |
| JP | 2008290485 | A * | 12/2008 | F28D 20/0034 |
| JP | 2018136067 | A * | 8/2018 | F24D 17/0078 |
| KR | 20180060255 | A * | 6/2018 | F28G 15/003 |
| KR | 20190127037 | A * | 11/2019 | B08B 9/032 |
| KR | 102221283 | B1 * | 3/2021 | B01F 35/7549 |

OTHER PUBLICATIONS

Radavich et al., "Cooling System For A Power Generation System On A Marine Vessel," U.S. Appl. No. 17/686,613, filed Mar. 4, 2022 (specification and drawings only).

Trac Ecological, "A/C Flush with Barnacle Buster," YouTube video, Feb. 7, 2014, https://www.youtube.com/watch?v=jUGCxpnAXyQ.

Trac Ecological, "Sea Flush Sea Strainer Adaptor," admitted prior art, available at https://www.trac-online.com/products/accessories/sea-flush.

RYDLYME Marine, "Portable Flushing Kit," admitted prior art, available at https://www.rydlymemarine.com/product/portable-flushing-kit/.

RYDLYME Marine, "RYDLYME Biodegradable Descaler is safe & effective!," YouTube video, Jun. 18, 2014, https://www.youtube.com/watch?v=QUiJMW-KzrY.

Seaflush, "How to clean your boat's A/C hoses with Sea Flush. See more uses at www.seaflush.com," YouTube video, Mar. 22, 2012, https://www.youtube.com/watch?v=onBV7VvCdBg.

\* cited by examiner

200

CLOSE INLET — 204

CONNECT MAINTENANCE LOOP — 208

CIRCULATE CLEANING SOLUTION — 212

DISCONNECT MAINTENANCE LOOP — 216

OPEN INLET — 220

300

304 — MONITOR CONDITIONS

TRACK TIME — 308

GENERATE ALARM — 312

316 — RECEIVE USER INPUT

RUN CLEANING CYCLE — 320

RESET TIMER — 324

COOLING SYSTEM FOR A MARINE VESSEL

FIELD

The present disclosure relates to marine vessels, and more specifically to systems for cooling onboard devices on a marine vessel.

BACKGROUND

U.S. Patent Application Publication No. 2021/0371064 discloses a system for a marine vessel that includes a peripheral device having an actuator configured to move part of the peripheral device between a retracted position and an extended position. A first serial bus is configured to connect the peripheral device to other peripheral devices. A controller is operatively connected to the actuator and is in signal communication with the first serial bus. A sensor is coupled to the controller via a second serial bus. The controller is configured to activate the actuator to move the part of the peripheral device from the extended position to the retracted position and from the retracted position to the extended position in response to information from the sensor.

U.S. Pat. No. 11,691,707 discloses a system for draining a cooling system of a power generation system on a marine vessel including a pump in fluid communication with the cooling system, the pump actively removing cooling water from the cooling system. An outlet drain discharges the cooling water. A controller starts the pump in response to an operator command to stop a prime mover of the marine power generation system and/or a speed of the prime mover being below a threshold speed. In one example, a temperature sensor determines a temperature of the cooling water in the cooling system, and the controller stops the pump in response to the temperature of the cooling water exceeding a threshold temperature. In another example, a sensor determines a pressure and/or a level of the cooling water in the cooling system, and the controller stops the pump in response to the pressure and/or the level of the cooling water dropping below a threshold pressure or a threshold level, respectively.

U.S. Pat. No. 11,293,335 discloses a cooling system for a marine inboard internal combustion engine including at least one engine cooling passage disposed in thermal communication with heat emitting portions of the engine. A pump is in fluid communication with the at least one engine cooling passage. The pump draws cooling water out of the at least one engine cooling passage. At least one outlet drain is downstream of the pump for discharging the cooling water that was pumped out of the at least one cooling passage. A switch activates the pump in response to the following: an operator command to stop the engine and/or a speed of the engine being below a threshold speed.

The above patents and applications are hereby incorporated by reference herein in their entireties.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In examples disclosed herein, a cooling system for a marine vessel may include a cooling loop for providing raw cooling water to a device to be cooled. The cooling loop may include an upstream inlet for receiving raw cooling water from a body of water in which the marine vessel is situated, a pump configured pump the raw cooling water through the cooling loop, a heat exchanger configured to transfer heat to the raw cooling water, and a downstream outlet for discharging the cooling water back to the body of water. A first switching valve may be downstream from the upstream inlet and upstream from the pump and a second switching valve may be downstream from the heat exchanger and upstream from the downstream outlet. A reservoir is configured to hold a cleaning solution and includes a reservoir outlet in fluid communication with the first switching valve and a reservoir inlet in fluid communication with the second switching valve. The reservoir outlet is upstream from the first switching valve and the reservoir inlet is downstream from the second switching valve. The first switching valve may be switchable between a first position in which the reservoir outlet is disconnected from the cooling loop and a second position in which the reservoir outlet is in fluid communication with the cooling loop via the first switching valve. The second switching valve may be switchable between a first position in which the reservoir inlet is disconnected from the cooling loop and a second position in which the reservoir inlet is in fluid communication with the cooling loop via the second switching valve. The pump may be configured to circulate the cleaning solution through the cooling loop when the first switching valve and the second switching valve are in the second position.

In examples disclosed herein, a method is disclosed for cleaning a cooling loop of a marine vessel that includes an upstream inlet for receiving raw cooling water from a body of water in which the marine vessel is situated, a pump for circulating raw cooling water through the cooling loop, and a downstream outlet for discharging the cooling water back to the body of water. The method may include running a cleaning cycle including switching the upstream inlet to a closed position to seal the upstream inlet; connecting a maintenance loop including a reservoir containing cleaning solution to the cooling loop by switching a first switching valve from a first position to a second position and switching a second switching valve from a first position to a second position; circulating, with the pump, the cleaning solution from the reservoir through the cooling loop, thereby cleaning the cooling loop; and disconnecting the maintenance loop from the cooling loop by switching the first switching valve and the second switching valve back to a second position.

BRIEF DESCRIPTION OF THE DRAWINGS

Examples of cooling systems and methods therefor are described with reference to the following Figures. The same numbers are used throughout the Figures to reference like features and like components.

DETAILED DESCRIPTION

Figure 1:
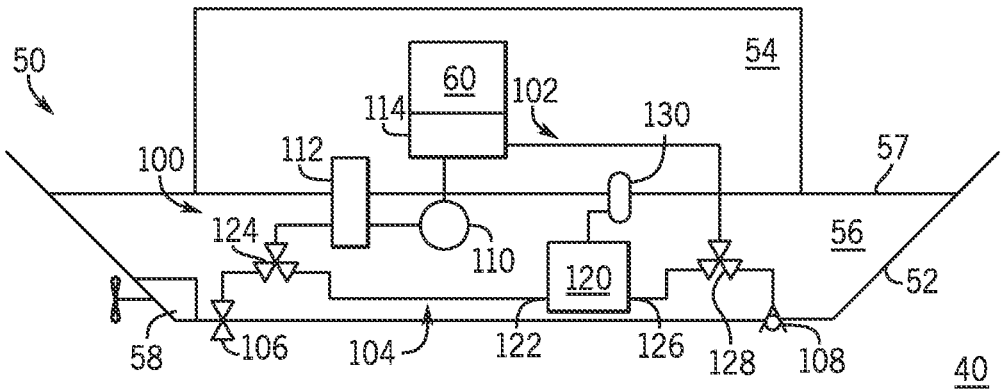
FIG. 1 illustrates one example of a marine vessel including a cooling system according to the present disclosure.

Before any embodiments of the invention are explained in detail, it is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless otherwise specified or limited, the phrases "at least one of A, B, and C," "one or more of A, B, and C," and the like, are meant to indicate A, or B, or C, or any combination of A, B, and/or C, including combinations with multiple instances of A, B, and/or C. Likewise, unless otherwise specified or limited, the terms "mounted," "connected," "linked," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "bottom," "front," "back," "left," "right," "upstream" or "downstream" features is generally intended as a description only of the orientation of such features relative to a reference frame of a particular example or illustration. Correspondingly, for example, a "top" feature may sometimes be disposed below a "bottom" feature (and so on), in some arrangements or embodiments. Additionally, use of the words "first," "second", "third," etc. is not intended to connote priority or importance, but merely to distinguish one of several similar elements from another.

During research and development in the field of marine vessel-based cooling systems, the present inventor determined that air conditioning water loop systems can routinely become fouled with debris, barnacles, or zebra mussels resulting in high pressure cutout safety trips on the refrigeration circuit and loss of function of the air conditioning system. Existing methods for cleaning an air conditioning water loop require an aftermarket system that must be manually installed. This process can be time consuming and frustrating as many of the parts that need to be accessed to install and then operate aftermarket systems are located in confined, hard-to-reach areas of the marine vessel, such as the bilge. Through research and experimentation, the present inventor determined that it would be advantageous to provide an integrated cleaning system that can be used without manually connecting or disconnecting any conduits and which does not require a user to access to hard-to-reach components. The present inventor additionally determined it would be advantageous to provide a cleaning system that can be configured to monitor the condition of the cooling loop and/or automatically run a cleaning process. The present disclosure is a result of the present inventor's efforts in this regard.

FIG. 1 illustrates one non-limiting example of a marine vessel 50, generally comprising a hull 52, an enclosed cabin 54, a bilge 56, and a marine drive 58 for propelling the marine vessel 50 through a body of water 40. A desired temperature in the cabin 54 can be maintained using an air conditioning system 60 configured to direct cooled air into the cabin 54. It should be understood that the marine vessel 50 may be equipped with a variety of peripheral devices and/or sensors, and that the size, location, and/or number of such devices may vary depending on the marine vessel 50 in question, the owner's preference, and/or governmental regulations. To cool the air directed into the cabin 54 by the air conditioning system 60, the illustrated marine vessel 50 includes a novel cooling system 100. The cooling system 100 includes an open cooling loop 102 configured to provide raw cooling water from the body of water 40 in which the marine vessel 50 is situated to the air conditioning system 60 and a maintenance loop 104 configured for cleaning the cooling system 100, as will be described in greater detail below.

The cooling loop 102 includes an upstream inlet 106 (i.e., a seacock) that is configured to receive raw cooling water from the body of water 40 and a downstream outlet 108 (i.e., a drain) that is configured to discharge the cooling water back to the body of water 40 after the heat has been exchanged between the raw cooling water and the air conditioning system 60. The upstream inlet 106 and the downstream outlet 108 both extend through the hull 52 from the bilge 56 to the exterior of the marine vessel 50. In the illustrated embodiments, the upstream inlet 106 is configured as a control valve switchable between an open position in which raw cooling water can be drawn into the cooling loop 102 and a closed position in which the upstream inlet 106 is sealed, thereby preventing raw cooling water from entering the cooling loop 102. The downstream outlet 108 is configured as a check valve that allows cooling water to exit the cooling loop 102 via the downstream outlet 108 while preventing raw cooling water from entering the cooling loop 102 via the downstream outlet 108. Some embodiments, however, may include a different type of valve configured as an upstream inlet and/or a downstream outlet. For example, a cooling loop may include a downstream outlet configured as a control valve switchable between an open position and a closed position.

A pump 110 is located downstream from the upstream inlet 106 and is configured to pump the cooling water from upstream to downstream through the cooling loop 102. A strainer 112 is located in the flow path between the upstream inlet 106 and the pump 110 and is configured to collect debris and other material drawn into the cooling loop 102 to prevent the debris from entering the pump 110. The air conditioning system 60 is located downstream from the pump 110 and includes a heat exchanger 114 which receives the raw cooling water from the pump 110. The heat exchanger 114 is configured to transfer heat from the air conditioning system 60 to the raw cooling water, in a known manner, before the heated raw water is returned to the body of water 40 from which it was drawn via the downstream outlet 108.

With continued reference to FIG. 1, the cooling system 100 includes a maintenance loop 104 that can be selectively connected to or disconnected from the cooling loop 102. The illustrated maintenance loop 104 includes a reservoir 120 with a reservoir outlet 122 connected to the cooling loop 102 via a first switching valve 124 and a reservoir inlet 126 connected to the cooling loop 102 via a second switching valve 128. The reservoir 120 is configured to hold a cleaning solution, such as a descaling solution, and includes a fill port 130 for adding cleaning solution to the reservoir 120.

The first and second switching valves 124, 128 are each switchable between first and second positions to connect or disconnect the maintenance loop 104 from the cooling loop 102. The first switching valve 124 is configured as a three-way T-port valve which is located downstream from the upstream inlet 106 and upstream from the pump 110 and is in fluid communication with the upstream inlet 106, the strainer 112, and the reservoir outlet 122. In a first position of the first switching valve 124, the reservoir outlet 122 is sealed off and disconnected from the cooling loop 102 and raw cooling water is permitted to flow from the upstream inlet 106 to the strainer 112 and pump 110 through the first switching valve 124. In a second position of the first switching valve 124, the reservoir outlet 122 is in fluid communication with the cooling loop 102 such that fluid can flow between the cooling loop 102 and the maintenance loop 104 via the first switching valve 124.

The second switching valve 128 is configured as a three-way L-port valve and is located downstream from the air conditioning system 60 and upstream from the downstream outlet 108. The second switching valve 128 is in fluid communication with the outlet of the heat exchanger 114, the downstream outlet 108, and the reservoir inlet 126. In a first position of the second switching valve 128, the reservoir inlet 126 is sealed off and disconnected from the cooling loop 102 while raw cooling water is permitted to flow from the heat exchanger 114 to downstream outlet 108 through the second switching valve 128. In a second position of the second switching valve 128, the reservoir inlet 126 is in fluid communication with the cooling loop 102 such that fluid can flow between the cooling loop 102 and the maintenance loop 104 via the second switching valve 128 while the downstream outlet 108 is disconnected from the cooling loop 102 while in the second position. Other embodiments, such as a cooling system with a downstream outlet configured as a switchable control valve, may include a second switching valve configured as a T-port three-way valve that does not disconnect the downstream outlet 108 from the cooling loop 102 while in the second position.

Figure 2:
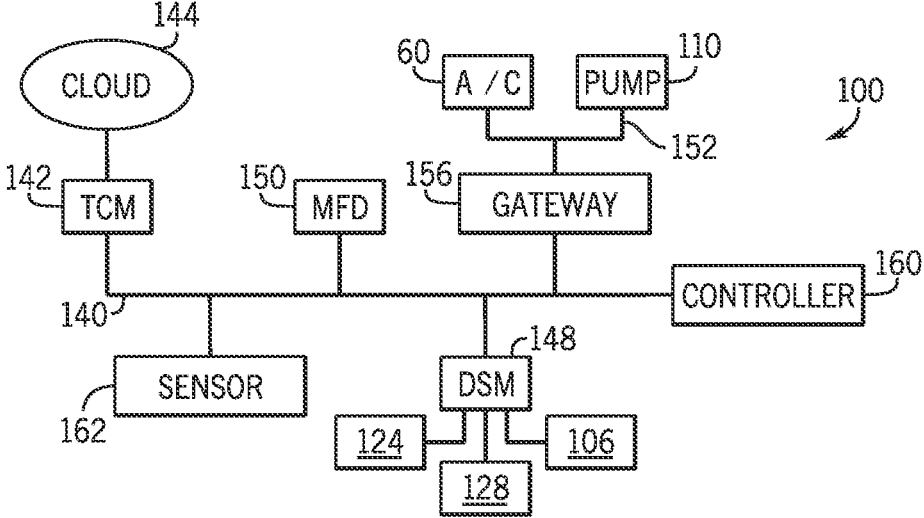
FIG. 2 illustrates an example of a cooling system for a marine vessel according to the present disclosure.

As illustrated in FIG. 1, the upstream inlet 106 and the first and second switching valves 124, 128 are positioned in the bilge 56 of the marine vessel 50 and are therefore difficult to access in order to manually switch the valves 106, 124, 128 between positions. Accordingly, the upstream inlet 106 and the first and second switching valves 124, 128 are configured as electronically controlled valves that can be controlled from a remote location. Referring to FIG. 2, the cooling system 100 includes a serial bus 140, such as a controller area network ("CAN") bus using the NMEA 2000 ("N2K") protocol, which is the communications standard for marine applications. In one example, serial bus 140 is the main CAN bus on the marine vessel 50 to which a helm control module (not shown) and/or an engine/motor control module (not shown) for the marine drive 58 are connected.

A telematics control module ("TCM") 142 is connected to the serial bus 140. The TCM 142 can relay information from wireless sensors (not shown) located on or near any peripheral devices to the cloud 144 via any appropriate wireless protocol. From the cloud 144, a user can access the information from the wireless sensors and other components of the cooling system 100. A digital switching module ("DSM") 148 is also linked to the serial bus 140. The DSM 148 receives inputs from a multi-function display ("MFD") or keypad 150 via the serial bus 140 and/or from one or more buttons or switches (not shown) wired to the DSM 148. In response to the inputs, solid state relays in the DSM 148 are activated or deactivated to control a peripheral devices, such as the upstream inlet 106 and the first and second switching valves 124, 128 wired to the DSM 148. The DSM 148 reduces the need to manually wire each peripheral device (e.g., 106, 124, 128) and sensor on the marine vessel 50 to the MFD or keypad 150 in order for the user to be able to control the peripheral device or view information from the sensors. Instead, the DSM 148 can be located remote from the MFD or keypad 150 and connected to the MFD or keypad 150 through the serial bus 140. The DSM 148 is wired to the peripheral device(s) and to the wired sensor(s), which may be located closer to the DSM 148 than to the MFD or keypad 150. Additional sensors (not shown) may also be wired to the DSM 148. Information from the wired sensors is transmitted to the serial bus 140 via the DSM 148. Through the serial bus 140, the sensed information can be relayed to the TCM 142 and from there to the cloud 144.

The cooling system 100 may include at least one peripheral device having a controller integrated therein. In the illustrated embodiments, the air conditioning system 60 and the pump 110 each include their own controllers (not shown). The cooling system 100 also includes an additional serial bus 152 connected to the controllers of the air conditioning system 60 and the pump 110. In one example, the serial bus 152 may also be a CAN bus using the N2K protocol. The secondary serial bus 152 is linked to the primary serial bus 140 by way of a gateway or bridge 156, depending on whether the two serial buses 140, 152 use the same protocol. (Note that some marine vessel components use different versions of the NMEA protocol and/or the serial bus 152 may be a LIN bus.) The additional serial bus 152 may be required due to a limit on the number of nodes on the primary serial bus 140 and/or to work around physical constraints on the marine vessel 50. Moreover, it may be desirable to provide an initially separate serial bus 152 to connect any peripheral devices as part of a retrofit, as at least some of such devices may not have been connected to a serial bus before, but instead hardwired to switches at the helm or connected to the DSM 148. Such a retrofit serial bus 152 could then be connected to the existing serial bus 140 on the marine vessel 50 by way of the gateway or bridge 156 without having to disturb the connections already made thereto. In another example, the serial buses 140 and 152 are a single bus. Note that although only two peripheral devices (i.e., the air conditioning system 60 and pump 110) are shown connected to the serial bus 152, additional peripheral devices could be connected thereto.

A cooling loop sensor 162 is connected to the serial bus 140 and is configured to measure a parameter of the cooling loop 102 that is indicative of the cleanliness of the cooling loop 102. In the illustrated embodiment, the cooling loop sensor 162 is a flow rate sensor configured to measure the flow rate of raw cooling water flowing through the cooling loop 102. For example, a cooling system 100 may include at least one of a differential pressure flowmeter, a velocity flowmeter, a positive displacement flowmeter, a mass flowmeter, an open-channel flow meter, and any other type of flow-measuring sensor as a cooling loop sensor 162. Additionally or alternatively, some embodiments may include a temperature sensor or any other type of sensor configured as a cooling loop sensor. In some embodiments, a sensor, such as the cooling loop sensor 162, may be connected to the serial bus 140 via the DSM 148 or wirelessly via the cloud 144 and the TCM 142.

A cooling system controller 160 is connected to the serial bus 140 and is configured to control the cooling system 100 to provide raw cooling water to the air conditioning system 60, and to run cleaning cycles using the maintenance loop 104. The controller 160 is communicatively connected to and configured to control at least one of the pump 110, the air conditioning system 60, the upstream inlet 106, the first switching valve 124, the second switching valve 128, and the cooling loop sensor 162. The controller 160 may include at least one transceiver for receiving information from the cooling loop sensor 162 (and any other connected sensors) via the serial bus 140. For example, the controller 160 has a bus interface (not shown) that is a CAN transceiver for communication with the CAN serial bus 140. Additionally or alternatively, some embodiments of a cooling system 100 may include a wireless controller that is connected to the serial bus 140 via the cloud 144 and the TCM 142.

The controller 160 also includes a processing system and a storage system. The processing system includes one or more processors, which may each be a microprocessor, a general-purpose central processing unit, an application-specific processor, a microcontroller, or any other type of logic-based device. The processing system may also include circuitry that retrieves and executes software from the storage system. The processing system may be implemented with a single processing device but may also be distributed across multiple processing devices or subsystems that cooperate in executing program instructions. The storage system can comprise any storage media, or group of storage media, readable by the processing system, and capable of storing software. The storage system may include volatile and non-volatile, removable and non-removable media implemented in any method or technology for storing information, such as computer-readable instructions, program modules comprising such instructions, data structures, etc. The storage system may be implemented as a single storage device but may also be implemented across multiple storage devices or subsystems. Examples of storage media include random access memory, read only memory, optical discs, flash memory, virtual memory, and non-virtual memory, or any other medium which can be used to store the desired information and that may be accessed by an instruction execution system, as well as any combination of variation thereof. The storage media may be housed locally with the processing system, or may be distributed, such as distributed on one or more network servers, such as in cloud computing applications and systems. In some implementations, the storage media is non-transitory storage media. In some implementations, at least a portion of the storage media may be transitory.

Figures 3, 4:
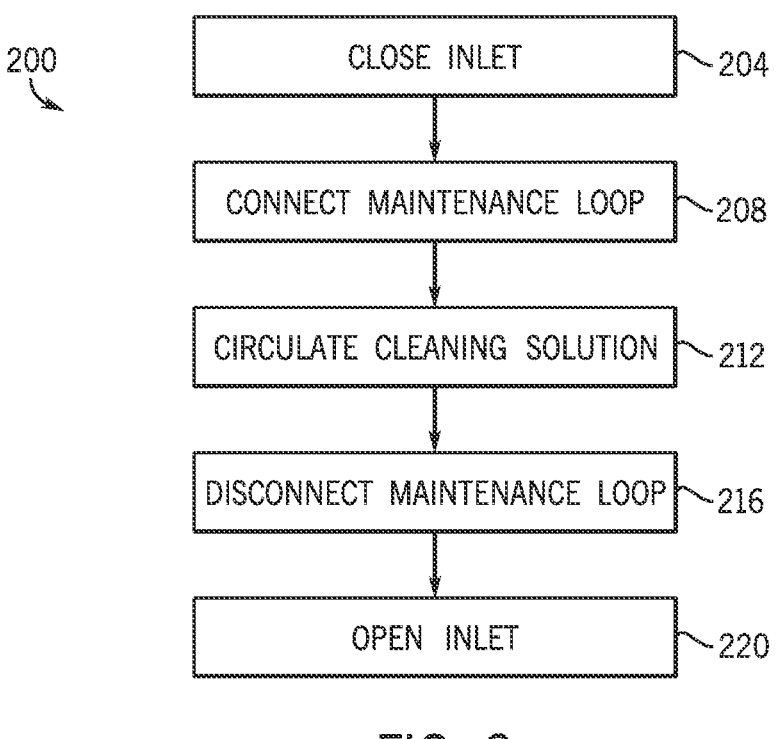
FIG. 3 illustrates an embodiment of a method for cleaning a cooling system according to the present disclosure.
FIG. 4 illustrates another embodiment of a method for cleaning a cooling system according to the present disclosure.

Referring to FIGS. 3 and 4, non-limiting examples of methods for operating the cooling system 100 are illustrated. Prior to running a cleaning cycle, a cleaning solution is added to the reservoir 120 via the fill port 130. Advantageously, the reservoir 120 and/or fill port 130 may be located in a convenient and easily accessed location on the marine vessel 50. As shown in FIG. 1, the fill port 130 and the strainer 112 are accessible through the deck 57 of the marine vessel 50. Some embodiments may include a strainer 112 and/or fill port 130 in different locations than those of the illustrated embodiments. For example, at least one of the strainer 112, the fill port 130, and the reservoir 120 may be positioned above the deck 57, either inside or outside of the cabin 54, below the deck 57 in a compartment accessible through a hatch (not shown), and/or in any other conveniently accessible location.

Referring to FIG. 3, a non-limiting example of a method 200 for running a cleaning cycle on the cooling loop 102 is shown. A cleaning cycle may be initiated manually by a user or automatically, as described in reference to FIG. 4. Once a cleaning cycle has been initiated, the cooling system controller 160 controls the cooling system 100 to seal the cooling loop 102, fluidly disconnecting the cooling loop 102 from the body of water 40 at process block 204. Sealing the cooling loop 102 may include controlling, with the cooling system controller 160, the upstream inlet 106 to switch from an open position to a closed position. In embodiments in which the downstream outlet 108 is configured as a switchable control valve, sealing the cooling loop 102 may additionally include controlling, with the cooling system controller 160, the downstream outlet 108 to switch from an open position to a closed position.

Once the cooling loop 102 is sealed, the maintenance loop 104 can be fluidly connected to the cooling loop 102 at process block 208. To connect the maintenance loop 104 to the cooling loop 102, the controller 160 can control the first switching valve 124 and the second switching valve 128 to switch from their first positions to their second positions. Switching the first switching valve 124 to the second position fluidly connects the outlet 122 of the reservoir 120 to the cooling loop 102 and switching the second switching valve 128 to the second position fluidly connects the inlet 126 of the reservoir 120 to the cooling loop 102. Connecting the maintenance loop 104 to the cooling loop 102 in this manner forms a closed circulation loop. In some embodiments, the pump 110 may be configured to continue running after the upstream inlet 106 has been closed in order to discharge raw cooling water from the cooling loop 102 via the downstream outlet 108 before connecting the maintenance loop 104 to the cooling loop 102. Other embodiments, however, may be configured to run the cleaning cycle with raw cooling water still in the closed circulation loop.

After connecting the maintenance loop 104 to the cooling loop 102, the pump 110 can be controlled to circulate the cleaning solution through the cooling loop 102 and maintenance loop 104 at process block 212. Once activated, the pump 110 draws cleaning solution out of the reservoir 120 from the reservoir outlet 122 and into the cooling loop 102 via the first switching valve 124. The cleaning solution is pumped through the cooling loop 102, including the strainer 112, the pump 110 and the heat exchanger 114. The cleaning solution then flows back into the reservoir 120 via the second switching valve 128 and the reservoir inlet 126. As the cleaning solution flows through the cooling system 100, any debris or particulate deposited in the cooling loop 102 during its normal operation is removed in order to clean the cooling loop 102.

The pump 110 may continue to circulate the cleaning solution for a predetermined amount of time, until the cleaning cycle is terminated by the user, or until the cooling system controller 160 instructs the pump 110 to cease pumping. Once a cleaning cycle is complete, the maintenance loop 104 can be disconnected from the cooling loop 102 by switching the first and second switching valves 124, 128 back to their first positions at process block 216. The upstream inlet 106 may then be switched from the closed position to the open position (see process block 220) so that normal cooling operations may resume.

As previously mentioned, the cooling system 100 may be configured to monitor the status of the cooling loop 102 to determine when a cleaning cycle needs to be run. Referring to FIG. 4, a non-limiting example of a method 300 for controlling a cooling system 100 is illustrated. While the cooling system 100 is idle or operating normally to provide cooling water to the air conditioning system 60, the cooling system controller 160 may monitor the condition of the cooling loop 102 at process block 304 and/or track an elapsed time since a cleaning cycle has been run at process block 308.

Monitoring the condition of the cooling loop 102 may include measuring a flow rate of the raw cooling water through the cooling loop 102 using the flow rate sensor 162. When the measured flow rate falls below a flow rate threshold, the controller 160 may determine that a cleaning cycle should be run. Additionally or alternatively, some embodiments may use a different type of sensor to monitor the condition of the cooling loop 102, such as a pressure sensor, a temperature sensor, and/or any other type of sensor that measures a parameter that is indicative of the cleanliness of the cooling loop 102. For example, a system may use at least one pressure sensor to measure a pressure drop between two points in the cooling loop 102. Debris in the cooling loop 102 may increase the measured pressure drop as it obstruct the flow path through the cooling loop 102. A temperature sensor may be used to monitor the condition of the cooling loop 102 by monitoring the temperature of the raw cooling water, the heated cooling water, and/or the temperature of any cooling fluid in the air conditioning system 60 (or any other connected device). As debris is deposited in the cooling loop 102, the measured temperature(s) will increase as the deposits restrict flow through the cooling loop 102. This may be interpreted by the cooling system controller 160 as an indication that a cleaning cycle is necessary.

After the cooling system controller 160 has determined that a cleaning cycle should be run based on the condition of the cooling loop 102 at process block 304, or that a maximum time since the last cleaning cycle has been exceeded at process block 308, a maintenance alert may be generated at process block 312. The controller 160 may communicate the maintenance alert to the multi-function display 150, to an indicator light (not shown) on the marine vessel 50, or to any other device. For example, an alert can be transmitted to a remote device, such as a smartphone, through the TCM 142 and the cloud 144.

Once a maintenance alert has been generated, the controller 160 may be configured to wait for a user input at process block 316. The user input may be entered using the keypad/MFD 150 (or any other input device on the marine vessel 50), or it may be communicated to the controller 160 from a remote device via the TCM 142 and the cloud 144. The controller 160 may then initiate a cleaning cycle at process block 320. The cleaning cycle may be performed according to the method 200 of FIG. 3, or according to another method. In some embodiments, the cooling system 100 may be configured to automatically run a cleaning cycle upon determining that one is recommended. In such an embodiment, the cooling system controller 160 may initiate a cleaning cycle after generating a maintenance alert without waiting for a user input, or the controller 160 may initiate a cleaning cycle without generating a maintenance alert. After the cleaning cycle is complete, the controller 160 resets the timer recording the time since the last cleaning cycle at process block 324. The cooling system 100 may then resume normal cooling operation.

Figure 5:
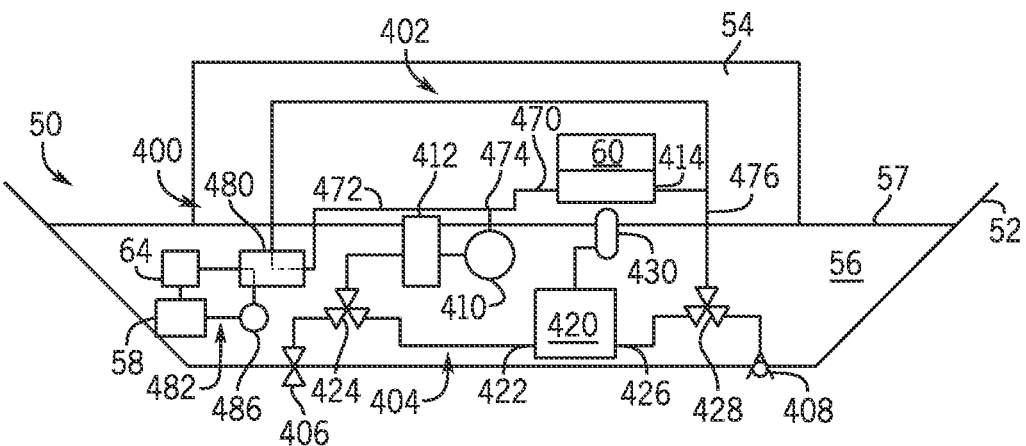
FIG. 5 illustrates another example of a cooling system for a marine vessel according to the present disclosure.

In the embodiments of FIGS. 1 and 2, the cooling system 100 is configured to provide raw cooling water to an air conditioning system 60. Some embodiments, however, may be configured to provide raw cooling water to at least one other type of device that requires cooling. For example, referring to FIG. 5, an embodiment of a cooling system 400 for a marine vessel 50 is configured for cooling multiple systems on the marine vessel 50. The cooling system 400 includes a cooling loop 402 that branches into a first cooling circuit 470 for cooling an air conditioning system 60 and a second cooling circuit 472 for cooling a marine drive 58 and a battery pack 64. The first cooling circuit 470 defines a flow path for the raw cooling water from the junction 474, to the air conditioning system 60, and back to a common drain line 476. The second cooling circuit 472 has a flow path that extends from the junction 474, to the heat exchanger 480 of a closed cooling loop 482, and back to the common drain line 476. The closed cooling loop 482 includes a coolant pump 486 that circulates a coolant withing the closed cooling loop 482 from the heat exchanger 480, to the marine drive 58 and the battery pack 64, and back to the heat exchanger 480. In the heat exchanger 480, thermal energy from the coolant of the closed cooling loop 482 is transferred to the raw cooling water flowing through the second cooling circuit 472. To clean the cooling loop 402, a maintenance loop 404 can be connected to the cooling loop 402 using first and second switching valves 424, 428 and cleaning solution can be circulated through the cooling loop 402 by a pump 410. In the illustrated embodiments, the first cooling circuit 470 and the second cooling circuit 472 are simultaneously cleaned when a cleaning cycle is run. Other embodiments, however, may be configured so that the cooling circuits 470, 472 may be individually cleaned. In such an embodiment, each cooling circuit 470, 472 may include additional control valves (not shown) at the beginning and end of their flow paths that can be closed to isolate one of the cooling circuits 470, 472 from the remainder of the cooling loop 402. Additionally or alternatively, some embodiments of a cooling system may be configured to provide raw cooling water to at least one additional device. Further still, embodiments of the illustrated cooling systems 100, 400 may be used on a marine vessel that does not include an air conditioning system.

In the present description, certain terms have been used for brevity, clarity, and understanding. No unnecessary limitations are to be implied therefrom beyond the requirement of the prior art because such terms are used for descriptive purposes only and are intended to be broadly construed. The different components and assemblies described herein may be used or sold separately or in combination with other components and assemblies. Various equivalents, alternatives, and modifications are possible within the scope of the appended claims.

What is claimed is:

1. A cooling system for a marine vessel, the cooling system comprising:
   a cooling loop for providing raw cooling water to a device to be cooled, the cooling loop comprising:
      an upstream inlet for receiving raw cooling water from a body of water in which the marine vessel is situated, wherein the upstream inlet is switchable between an open position in which the raw cooling water can flow into the cooling loop and a closed position in which the upstream inlet is sealed;
      a pump configured to pump the raw cooling water through the cooling loop;
      a heat exchanger configured to transfer heat to the raw cooling water; and
      a downstream outlet for discharging the raw cooling water back to the body of water;
   a first switching valve downstream from the upstream inlet and upstream from the pump and a second switching valve downstream from the heat exchanger and upstream from the downstream outlet; and
   a reservoir configured to hold a cleaning solution and including a reservoir outlet in fluid communication with the first switching valve and a reservoir inlet in fluid communication with the second switching valve, the reservoir outlet being upstream from the first switching valve and the reservoir inlet being downstream from the second switching valve;
   wherein the first switching valve is switchable between a first position in which the reservoir outlet is disconnected from the cooling loop and a second position in which the reservoir outlet is in fluid communication with the cooling loop via the first switching valve;

wherein the second switching valve is switchable between a first position in which the reservoir inlet is disconnected from the cooling loop and the raw cooling water is permitted to flow from the heat exchanger to the downstream outlet and a second position in which the reservoir inlet is in fluid communication with the cooling loop via the second switching valve and the downstream outlet is disconnected from the cooling loop; and wherein the pump is configured to circulate the cleaning solution through the cooling loop when the first switching valve and the second switching valve are in the second position.

2. The cooling system of claim 1, wherein the reservoir includes a fill port for adding cleaning solution to the reservoir.

3. The cooling system of claim 1, wherein the cleaning solution is a descaling solution.

4. The cooling system of claim 1, wherein the first switching valve and the second switching valve are located in a bilge of the marine vessel.

5. The cooling system of claim 1, further comprising a controller configured to selectively control the first switching valve, the second switching valve, and the pump.

6. The cooling system of claim 5, further comprising at least one flow sensor for measuring a flow rate of the raw cooling water through the cooling loop;

wherein the controller is configured to control the first and second switching valves and the pump to run a cleaning cycle based on flow rate measurements from the flow sensor.

7. The cooling system of claim 5, wherein the controller is configured to control the first and second switching valves and the pump to run a cleaning cycle according to a programmed cleaning schedule.

8. The cooling system of claim 5, further comprising a serial bus configured to connect the controller to at least one of the pump, the first switching valve, and the second switching valve.

9. The cooling system of claim 5, wherein the controller is configured to determine if a cleaning cycle is required and to generate a maintenance alert in response to determining that a cleaning cycle is required.

10. The cooling system of claim 9, wherein the controller is configured to transmit the maintenance alert to a remote device.

11. The cooling system of claim 1, wherein the downstream outlet comprises a check valve configured to allow the raw cooling water to exit the cooling loop while preventing the raw cooling water from entering the cooling loop via the downstream outlet.

12. The cooling system of claim 1, wherein the cooling loop further comprises a strainer in the flow path between the upstream inlet and the pump.

13. A method for cleaning a cooling loop of a marine vessel, the cooling loop including an upstream inlet for receiving raw cooling water from a body of water in which the marine vessel is situated, a pump for circulating the raw cooling water through the cooling loop, a heat exchanger configured to transfer heat to the raw cooling water, and a downstream outlet for discharging the raw cooling water back to the body of water, the method comprising:

running a cleaning cycle, the cleaning cycle comprising:

switching the upstream inlet from an open position in which the raw cooling water can flow into the cooling loop to a closed position to seal the upstream inlet;

connecting a maintenance loop including a reservoir containing cleaning solution to the cooling loop by:

switching a first switching valve that is downstream from the upstream inlet and upstream from the pump from a first position in which a reservoir outlet that is upstream from the first switching valve is disconnected from the cooling loop to a second position in which the reservoir outlet is in fluid communication with the cooling loop via the first switching valve; and switching a second switching valve that is downstream from the heat exchanger and upstream from the downstream outlet from a first position in which a reservoir inlet that is downstream from the second switching valve is disconnected from the cooling loop and the raw cooling water is permitted to flow from the heat exchanger to the downstream outlet to a second position in which the reservoir inlet is in fluid communication with the cooling loop via the second switching valve and the downstream outlet is disconnected from the cooling loop;

circulating, with the pump, the cleaning solution from the reservoir through the cooling loop while the first switching valve and the second switching valve are in the second position, thereby cleaning the cooling loop; and disconnecting the maintenance loop from the cooling loop by switching the first switching valve and the second switching valve back to the first position.

14. The method of claim 13, further comprising measuring, with a cooling loop sensor, a parameter of the cooling loop indicative of a status of the cooling loop; and determining, with a controller, that the cooling loop requires cleaning based on the parameter of the cooling loop measured by the cooling loop sensor.

15. The method of claim 13, further comprising measuring, with a controller, an elapsed time since the cleaning cycle was last run; and determining, with the controller, that the cooling loop requires cleaning when the elapsed time exceeds a programmed time threshold.

16. The method of claim 13, further comprising:

determining, with a controller, that the cooling loop requires cleaning;

generating a maintenance alert indicating that the cooling loop requires cleaning; and running a cleaning cycle in response to a user input.

17. A marine vessel comprising:

an enclosed cabin;

an air conditioning system configured to cool the enclosed cabin;

a cooling loop for providing raw cooling water from a body of water to the air conditioning system to cool the air conditioning system, the cooling loop comprising:

an upstream inlet extending through a hull of the marine vessel below a waterline of the body of water, wherein the raw cooling water from the body of water is received into the cooling loop via the upstream inlet;

a pump configured to pump the raw cooling water through the cooling loop;

a heat exchanger configured to transfer heat from the air conditioning system to the raw cooling water; and a downstream outlet extending through the hull below the waterline of the body of water, wherein the raw cooling water from the heat exchanger is discharged back to the body of water via the downstream outlet;

a first switching valve downstream from the upstream inlet and upstream from the pump and a second switching valve downstream from the heat exchanger and upstream from the downstream outlet; and a reservoir configured to hold a cleaning solution and including a reservoir outlet in fluid communication with the first switching valve and a reservoir inlet in fluid communication with the second switching valve, the reservoir outlet being upstream from the first switching valve and the reservoir inlet being downstream from the second switching valve;

wherein the first switching valve is switchable between a first position in which the reservoir outlet is disconnected from the cooling loop and a second position in which the reservoir outlet is in fluid communication with the cooling loop via the first switching valve;

wherein the second switching valve is switchable between a first position in which the reservoir inlet is disconnected from the cooling loop and a second position in which the reservoir inlet is in fluid communication with the cooling loop via the second switching valve; and wherein the pump is configured to circulate the cleaning solution through the cooling loop when the first switching valve and the second switching valve are in the second position.

18. The marine vessel according to claim 17, further comprising at least one of a marine drive and a battery pack;

wherein the heat exchanger is a first heat exchanger, and the cooling loop comprises a second heat exchanger configured to transfer heat from the at least one of the marine drive and the battery pack to the raw cooling water.

19. The marine vessel according to claim 17, further comprising a controller configured to selectively control the first switching valve, the second switching valve, and the pump to run a cleaning cycle according to a programmed cleaning schedule.

* * * * *